(12) United States Patent
Lee et al.

(10) Patent No.: US 12,491,948 B2
(45) Date of Patent: Dec. 9, 2025

(54) APPARATUS FOR LOCKING CHASSIS FRAMES

(71) Applicants: Hyundai Motor Company, Seoul (KR); Kia Corporation, Seoul (KR)

(72) Inventors: Yong Uk Lee, Hwaseong-si (KR); Seong Jae Shin, Uiwang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 762 days.

(21) Appl. No.: 17/822,365

(22) Filed: Aug. 25, 2022

(65) Prior Publication Data

US 2023/0071817 A1    Mar. 9, 2023

(30) Foreign Application Priority Data

Sep. 3, 2021 (KR) .......................... 10-2021-0117297

(51) Int. Cl.
*B62D 27/06* (2006.01)
*B62D 21/14* (2006.01)

(52) U.S. Cl.
CPC ............. *B62D 27/06* (2013.01); *B62D 21/14* (2013.01)

(58) Field of Classification Search
CPC ...... B62D 27/06; B62D 21/14; B62D 63/025; B62D 21/06; B62D 21/12; B62D 21/17; B62D 25/2009
See application file for complete search history.

(56) References Cited

FOREIGN PATENT DOCUMENTS

KR    19980025022 U    7/1998

*Primary Examiner* — Jason D Shanske
*Assistant Examiner* — Al-Birr Rahman Chowdhury
(74) *Attorney, Agent, or Firm* — Slater Matsil, LLP (57) ABSTRACT

An apparatus for locking chassis frames includes a locking assembly configured to be positioned at one end of a first chassis frame; and a receiving unit configured to be positioned in a second chassis frame corresponding to the first chassis frame in a longitudinal direction, and configured such that at least a part of the locking assembly is configured to be inserted into the receiving unit. The locking assembly includes a cylinder housing configured to be positioned in the first chassis frame, a locking unit moved in the cylinder housing, and a first switch part positioned at one end of the cylinder housing, and configured to drive a fluid pressure unit when the second chassis frame comes into contact with the first chassis frame.

17 Claims, 6 Drawing Sheets

APPARATUS FOR LOCKING CHASSIS FRAMES

CROSS-REFERENCE TO RELATED APPLICATIONS

This application claims under 35 U.S.C. § 119(a) the benefit of priority to Korean Patent Application No. 10-2021-0117927 filed on Sep. 3, 2021, the entire contents of which are incorporated herein by reference.

TECHNICAL FIELD

The present disclosure relates to an apparatus for locking chassis frames.

BACKGROUND

In general, a chassis frame of a vehicle is mounted with a wheel which rotates, on the lower side thereof, is coupled to a drive vehicle as a device for generating power, and is mounted with a cargo box on the upper side thereof so as to be used to transport various kinds of loads. A chassis of the vehicle generally consists of a C-shaped or H-shaped chassis body and a cross member which couples the chassis body in the transverse direction. Recently, a chassis provided with a fastening device at each corner portion on the upper surface thereof and configured to mount and dismount a container box has been proposed.

Such a chassis dedicated for a container is proposed to load only a standardized container, and thus, has a limitation in the use thereof. Further, such a chassis has problems such as a clearance due to loaded and unloaded actions, and a weak fastening strength. Recently, various types of vehicles such as vans or passenger cars for transporting people, various kinds of trucks or cargo truck for transporting cargos, and various special vehicles equipped with special equipment such as ready-mixed concrete mixer trucks, cranes, and tank lorries are provided. Further, recently, newly developed equipment with ambiguous classification is widely distributed.

Furthermore, recently, commercial vehicles using drones are developed by securing autonomous driving performance of a driving vehicle, and various loading types and expansion of cargo boxes are necessarily required in response to the driving force of the drones.

Therefore, efforts to expand a loading space through the development of a structure for locking chassis frames each having a cargo box are necessarily required.

SUMMARY

Embodiments of the present disclosure include an apparatus for locking two chassis frames adjacent to each other capable of selectively fastening chassis frames.

Embodiments of the present disclosure further provide an apparatus for locking chassis frames configured to provide a cylinder configuration capable of performing double locking in such a way to be automatically driven when chassis frames adjacent to each other come into contact with each other.

An apparatus for locking chassis frames may include the following configuration according to some embodiments.

As an exemplary embodiment of the present disclosure, an apparatus for locking chassis frames includes a locking assembly positioned at one end of a first chassis frame; a second chassis frame corresponding to the first chassis frame in a longitudinal direction; and a receiving unit positioned in the second chassis frame, and configured such that at least a part of the locking assembly is inserted into the receiving unit, wherein the locking assembly provides a cylinder housing positioned in the first chassis frame, a locking unit moved in the cylinder housing, a cylinder positioned in the locking unit and extending out of the locking unit, the fluid pressure unit configured to apply a fluid pressure to a chamber positioned on a rear surface of the locking unit so as to control movement of the locking unit and the cylinder, and a first switch part positioned at one end of the cylinder housing, and configured to perform driving of a fluid pressure unit when the second chassis frame comes into contact with the first chassis frame.

Further, the apparatus for locking chassis frames includes a motor positioned in the receiving unit, and a gear part protruding an inner side of the receiving unit to be applied with a rotating force of the motor, and configured to rotate the cylinder when the cylinder extends out of the locking unit.

Further, the apparatus for locking chassis frames in which the protrusion is configured to be rotated by the gear part and be engaged with an engagement part which is positioned in the guide part is provided.

Further, the apparatus for locking chassis frames further includes a second switch positioned on an inner surface of the receiving unit, and configured to perform driving of the motor when the cylinder comes into contact with the inner surface of the receiving unit.

Further, the apparatus for locking chassis frames in which when the first switch is switched to a turned-on state, a fluid is introduced so that a pressure is applied from the fluid pressure unit into the chamber, and the locking unit and the cylinder are integrally introduced into the receiving unit is provided.

Further, the apparatus for locking chassis frames in which, in a state which the locking unit comes into contact with the inner surface of the receiving unit by the fluid pressure unit, the fluid is introduced so that the cylinder additionally protrudes out of the locking unit is provided.

Further, the apparatus for locking chassis frames further includes a third switch positioned on the inner surface of the receiving unit, and configured to determine whether the locking unit comes into contact with the inner surface of the receiving unit or not.

Further, the apparatus for locking chassis frames in which an edge of the locking unit is configured as a chamfered region is provided.

Further, the apparatus for locking chassis frames in which the fluid pressure unit is configured to discharge the fluid applied into the chamber so that fastening of the first chassis frame and the second chassis frame is released is provided.

Further, the apparatus for locking chassis frames in which the chamber includes a locking chamber positioned on a rear surface of the locking unit; and a cylinder chamber positioned on a rear surface of the cylinder is provided.

The present disclosure may obtain the following effects by the aforementioned exemplary embodiment and the configuration, coupling, and use relationship to be described later.

The present disclosure may provide chassis frames capable of being selectively extended through an apparatus for locking chassis frames.

Further, the present disclosure may provide an apparatus for locking chassis frames which automatically fastens chassis frames adjacent to each other, thereby providing easy fastening relationship.

DETAILED DESCRIPTION OF ILLUSTRATIVE EMBODIMENTS

Hereinafter, embodiments of the present disclosure will be described in more detail with reference to the accompanying drawings. The embodiments of the present disclosure may be modified in various forms, and the scope of the present disclosure should not be construed as being limited to the following embodiments. The present embodiment is provided to more fully explain the present disclosure to those skilled in the art.

Further, terms such as " . . . part," " . . . unit," and " . . . frame" described in the specification mean a unit that processes at least one function or operation, and these may be implemented by hardware, software, or a combination of hardware and software.

Further, in the present specification, the reason why the names of the components are divided into a first, a second, etc. is to distinguish the names of the components in the same relationship, and the components are not necessarily limited to orders thereof in the following description.

Further, in the present specification, the names of the components as a first and a second are referred to chassis frames adjacent to each other, and the components are not necessarily limited to orders thereof.

Hereinafter, an exemplary embodiment will be described in detail with reference to the accompanying drawings, and in describing the exemplary embodiment with reference to the accompanying drawings, the same or corresponding components are denoted by the same reference numerals and overlapping descriptions thereof will be omitted.

The present disclosure relates to a chassis frames locking apparatus for fastening chassis frames of vehicles adjacent to each other, and provides a technology capable of selectively extending or releasing a cargo box by fastening chassis frames of a commercial vehicle including the cargo box.

Furthermore, the commercial vehicle of the present disclosure may provide a chassis frame including a container cargo box, and provides a structure capable of fastening container cargo boxes and being fastened to an autonomous driving drone capable of providing the driving force of the vehicle.

Some embodiments relate to an apparatus for locking chassis frames and/or to an apparatus for locking chassis frames, which provides a locking unit and a receiving unit for locking chassis frames adjacent to each other and is configured to be capable of locking a chassis frame and an adjacent chassis frame in order to allow a cargo box to be selectively extended.

Hereinafter, a first chassis frame 10 and a second chassis frame 20 refer to vehicle bodies which configure different vehicles or cargo boxes, and each of the first chassis frame 10 and the second chassis frame 20 may have a structure including two frames spaced apart from each other.

The first chassis frame 10 configured by two frames may include a locking assembly 30 which is positioned at the end of one frame of the first chassis frame 10, and may include a receiving unit 200 which is positioned at the end of the other frame of the first chassis frame 10. The second chassis frame 20 may include a receiving unit 200 at a position corresponding to the one frame of the first chassis frames 10 which includes the locking assembly 30, and may include a locking assembly 30 at a position corresponding to the other frame of the first chassis frames 10 which includes the receiving unit 200.

That is, in one chassis frame, the locking assembly 30 and the receiving unit 200 may be positioned at the ends, respectively, of both frames, and in correspondence to this, in the other adjacent chassis frame, the receiving unit 200 and the locking assembly 30 may be configured at the ends, respectively, of both frames.

Hereinafter, with reference to the drawings, description will be made for the locking assembly 30 which is positioned on the one frame of the first chassis frame 10 and the receiving unit 200 which is configured in the second chassis frame 20, positioned adjacent to the first chassis frame 10, at a position corresponding to the locking assembly 30.

Figure 1:
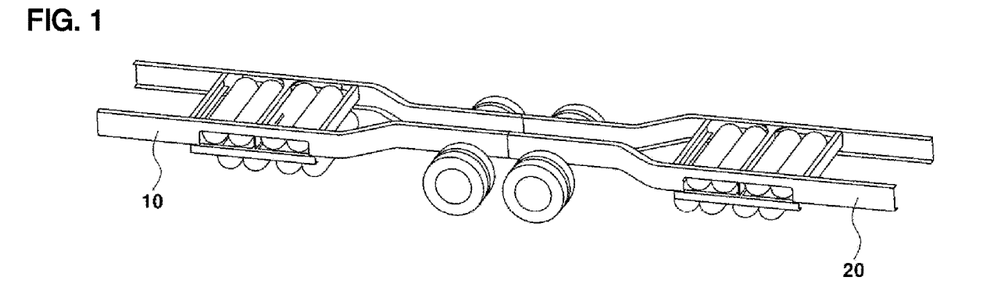
FIG. 1 illustrates a chassis frame for performing fastening between a first chassis frame and a second chassis frame as an exemplary embodiment of the present disclosure.
Figure 2:
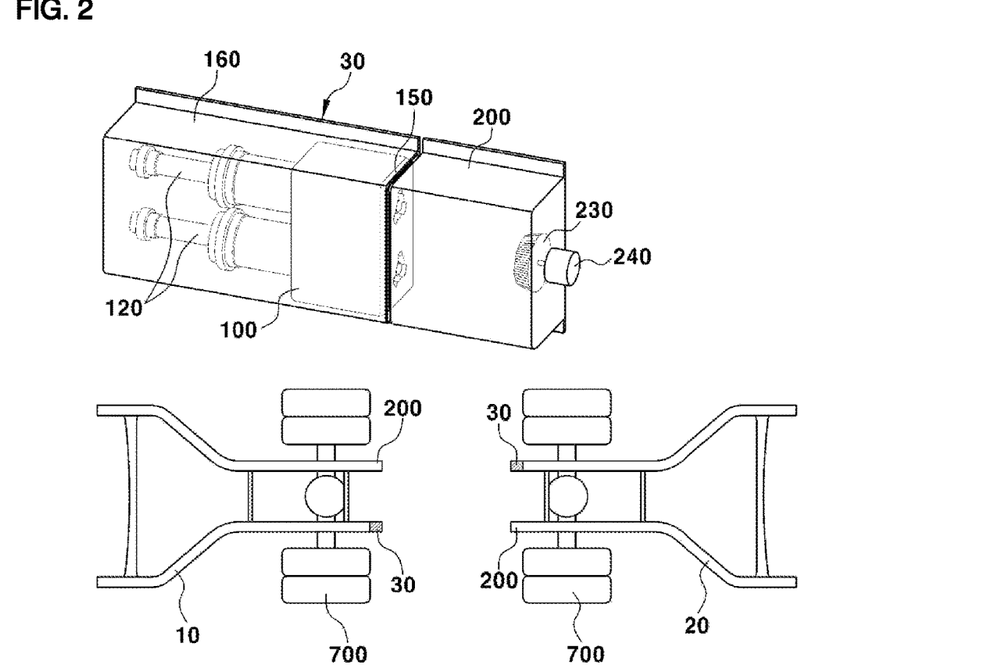
FIG. 2 illustrates a configuration of a locking unit positioned on the first chassis frame as the exemplary embodiment of the present disclosure.

FIGS. 1 and 2 illustrate, as an exemplary embodiment of the present disclosure, a fastening relationship of commercial vehicles performing fastening between the first chassis frame 10 and the second chassis frame 20.

As illustrated, the commercial vehicle including the first chassis frame 10 is configured such that the first chassis frame 10 is fastened to the second chassis frame 20 of the adjacent commercial vehicle including the second chassis frame 20. In the exemplary embodiment of the present disclosure, the second chassis frame 20 is fastened to one end of the first chassis frame 10 including a rear axle 700 of the commercial vehicle. Furthermore, one end of the second chassis frame 20 which is fastened to the first chassis frame 10 may be at a position including a rear axle 700.

The first chassis frame 10 may consist of two frames which are spaced apart from each other and are positioned in the longitudinal direction. One end of one of the two frames includes the locking assembly 30. One end of the other of the two frames may include the receiving unit 200 or the locking assembly 30.

In the exemplary embodiment of the present disclosure, since description is made for the first chassis frame 10 including the locking assembly 30, the second chassis frame 20 includes the receiving unit 200. Furthermore, the first chassis frame 10 and the second chassis frame 20 which are fastened to each other consist of two pairs of frames configured to have the same width as each other.

The locking assembly 30 may be configured to include a cylinder housing 160 which is separately positioned at the end of the first chassis frame 10. At least one cylinder 120 may be included in the cylinder housing 160 of the locking assembly 30. Furthermore, the locking assembly 30 includes a locking unit 100 which can be moved along the longitudinal direction in the cylinder housing 160 and through which the cylinder 120 passes. The locking unit 100 and the cylinder 120 include a fluid pressure unit 600 which provides a fluid pressure to allow the locking unit wo and the cylinder 120 to be extended or contracted along the longitudinal direction of the cylinder housing 160 positioned in the first chassis frame 10.

The fluid pressure unit 600 is positioned in the cylinder housing 160, and, is configured to introduce or discharge fluid, positioned in the fluid pressure unit 600, into or from a selected chamber in response to a user's request or inputs of first to third switches.

The fluid pressure unit 600 is configured to introduce the fluid into a chamber formed on the rear surface of the locking unit 100 close to the inner end of the cylinder housing 160 so that the locking unit 100 and the cylinder 120 are moved in the longitudinal direction. The fluid pressure unit 600 may include a locking chamber no which is positioned on the rear surface of the locking assembly 30 and a cylinder chamber 130 which is capable of separately providing a fluid pressure to the cylinder 120.

The fluid pressure unit 600 may be configured to simultaneously move the locking unit wo and the cylinder 120 in the longitudinal direction. Further, the fluid pressure unit 600 is configured to move the cylinder 120 in the longitudinal direction independently of the locking unit 100 of the locking assembly 30. That is, the fluid pressure unit 600 is configured to be coupled to each of the locking chamber no and the cylinder chamber 130, and is configured to introduce the fluid simultaneously or separately into the locking chamber no and the cylinder chamber 130 from a fluid tank (not illustrated) positioned in the fluid pressure unit 600. On the other hand, the fluid pressure unit 600 is configured to, when the coupling between the first chassis frame 10 and the second chassis frame 20 is released, simultaneously or respectively return the fluid introduced into the locking chamber no and the cylinder chamber 130 to the fluid tank.

That is, the fluid pressure unit 600 is configured to perform extension, in the longitudinal direction, of the locking unit 100 and the cylinder 120 positioned in the locking assembly 30 and perform returning of the extended locking unit 100 and cylinder 120, by using the fluid pressure.

The first switch 300 is positioned at one end of the locking assembly 30 facing the receiving unit 200 and is configured to be turn on when the locking unit 100 and the receiving unit 200 come into contact with each other. The first switch 300 may be positioned at the outermost surface of the receiving unit 200. The first switch 300 may be configured by a push-type switch. As the locking assembly 30 and the receiving unit 200 come into contact with each other, the first switch 300 may be switched to a pushed (turned-on) state. Accordingly, the fluid pressure unit 600 is configured to apply a fluid pressure from the fluid tank to the locking chamber no and the cylinder chamber 130.

The cylinder 120 includes at least one protrusion 140 positioned on an outer circumference thereof. In detail, one or more protrusions 140 may be positioned along the outer circumferential surface of the cylinder 120, and may be positioned in the longitudinal direction of the cylinder 120.

The receiving unit 200 is configured to face the locking unit wo so that at least a part of the locking unit wo is inserted therein, and includes a guide part 210 corresponding to a moving position of the cylinder 120 so that the cylinder 120 may be extended in the longitudinal direction. That is, the guide part 210 is configured to be positioned in the receiving unit 200 so that the cylinder 120 and the protrusion 140 positioned on the outer surface of the cylinder 120 are inserted therein. When the cylinder 120 comes into contact with one inner end of the receiving unit 200, the protrusion 140 of the cylinder 120 is rotated and inserted into an engagement part 220 positioned in the guide part 210 so as to limit the movement of the cylinder 120 in the longitudinal direction.

The guide part 210 is configured to correspond to the movement of the cylinder 120 in the longitudinal direction, and the engagement part 220 is formed along the widthwise direction of the guide part 210. In a state that the cylinder 120 is completely inserted into the guide part 210, the protrusion 140 is positioned to correspond to the engagement part 220. Thereafter, when the cylinder 120 is rotated by a gear part 230, the protrusion 140 is rotated and moved into the engagement part 220.

Figure 3:
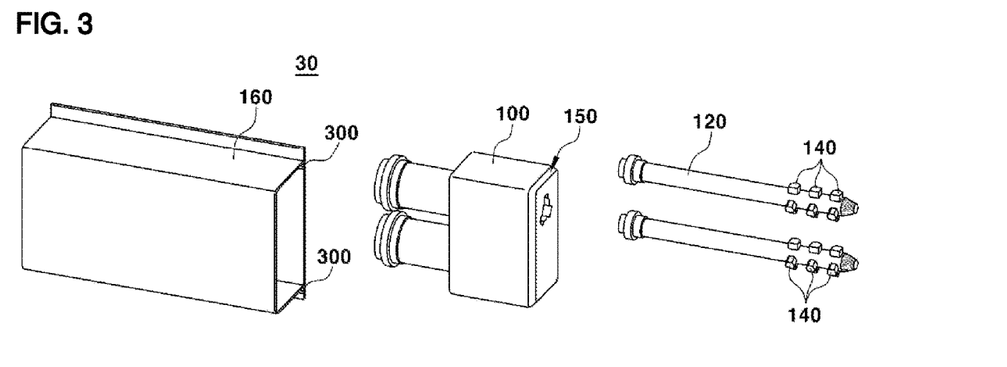
FIG. 3 illustrates a configuration diagram of the locking unit positioned on the first chassis frame as the exemplary embodiment of the present disclosure.

FIG. 3 illustrates a configuration of the locking assembly 30 positioned at one end of the first chassis frame 10 as the exemplary embodiment of the present disclosure.

As illustrated, the first chassis frame 10 includes the locking assembly 30 positioned inside one end thereof, and includes the locking unit 100 which is moved in the cylinder housing 160 of the locking assembly 30 and at least one cylinder 120 which is configured to pass through the locking unit 100. The cylinder 120 is configured to pass through the cylinder housing 160 in the longitudinal direction. The locking chamber no and the cylinder chamber 130 are formed on the rear surface of the locking unit 100 and the rear surface of the cylinder 120, respectively.

A movement restriction part is further included on the rear surface of the cylinder 120 facing the cylinder chamber 130. The cylinder 120 is configured to be moved in the longitudinal direction and come into contact with the inner surface positioned in the cylinder housing 160. Accordingly, the moving distance of the cylinder 120 in the longitudinal direction may be limited through the movement restriction part. In addition, a cylinder release chamber corresponding to the cylinder chamber 130 with respect to the movement restriction part may be defined, so that the extension and contraction of the cylinder 120 in the longitudinal direction may be controlled through the fluid pressure unit 600.

The movement restriction part may be configured as a sealing part so that the fluid introduced into the cylinder chamber 130 does not leak.

Figure 4A:
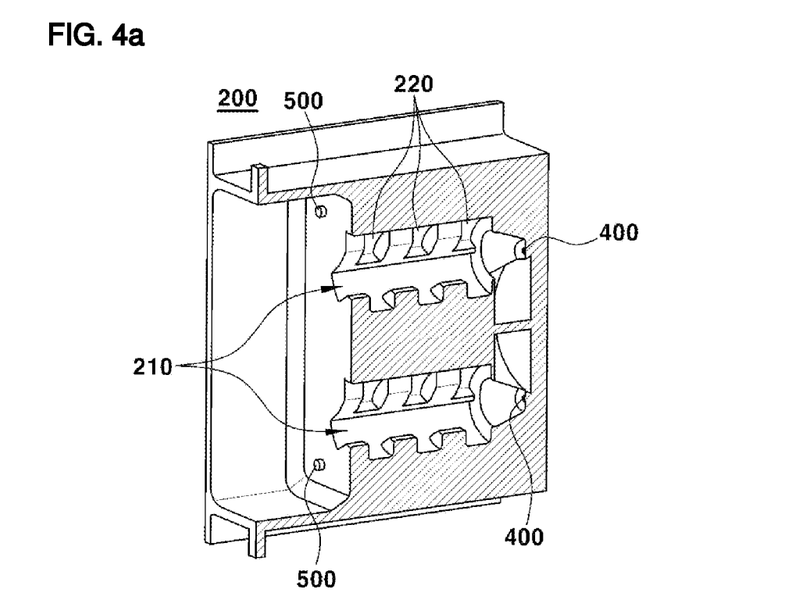
FIG. 4a illustrates a configuration of a receiving unit positioned on the second chassis frame as the exemplary embodiment of the present disclosure.
Figure 4B:
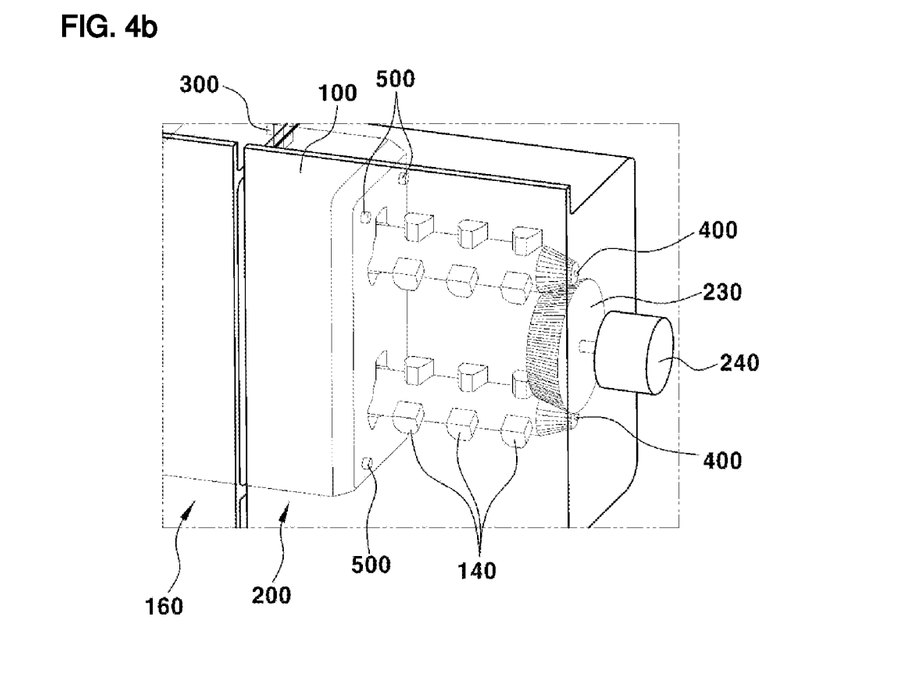
FIG. 4b illustrates a configuration in which the locking unit and the receiving unit are fastened as the exemplary embodiment of the present disclosure.

FIG. 4a illustrates a configuration of the receiving unit 200 positioned in the second chassis frame 20, and FIG. 4b illustrates a configuration in which the locking assembly 30 and the cylinder 120 are fastened in the receiving unit 200.

As illustrated, the receiving unit 200 corresponding to the locking assembly 30 positioned at one end of the first chassis frame 10 is included at one end of the second chassis frame 20. The receiving unit 200 is configured such that at least a part of the locking unit 100 of the locking assembly 30 is inserted therein. In addition, the receiving unit 200 includes a guide part 210 which ensures that, in a state where the locking unit 100 and the inner surface of the receiving unit 200 come into contact with each other, the cylinder 120 including the plurality of protrusions 140 is additionally inserted into the receiving unit 200.

When the cylinder 120 comes into contact with the end of the guide part 210 of the receiving unit 200, the cylinder 120 is meshed with the gear part 230. As a motor 240 positioned in the receiving unit 200 rotates the gear part 230, the protrusion 140 of the cylinder 120 is inserted into the engagement part 220.

The gear part 230 is positioned in the guide part 210 of the receiving unit 200, and is configured to be simultaneously meshed with the ends of the one or more cylinders 120. When a second switch 400 positioned in the guide part 210 is turned on by the cylinder 120, the motor 240 is driven and rotates the gear part 230. Accordingly, the cylinder 120 which is meshed with the gear part 230 is integrally rotated, and the protrusion 140 of the cylinder 120 is inserted into the engagement part 220 positioned in the guide part 210.

Further, a third switch 500 for determining a fastened state of the locking unit 100 and the receiving unit 200 is included at one end of the receiving unit 200 which is in contact with the locking assembly 30. Furthermore, only when the second switch 400 is turned on after the third switch 500 is turned on, the driving of the motor 240 may be performed. Thus, the rotation of the protrusion 140 may be performed only when both the locking unit 100 and the cylinder 120 are deployed into the receiving unit 200.

Through a coupling structure described above, fastening of the locking unit 100 and the receiving unit 200 in the longitudinal direction may be performed. Furthermore, as at least a part of the locking unit 100 is introduced into the receiving unit 200, rigidity in the vertical direction may be maintained.

Figure 5A:
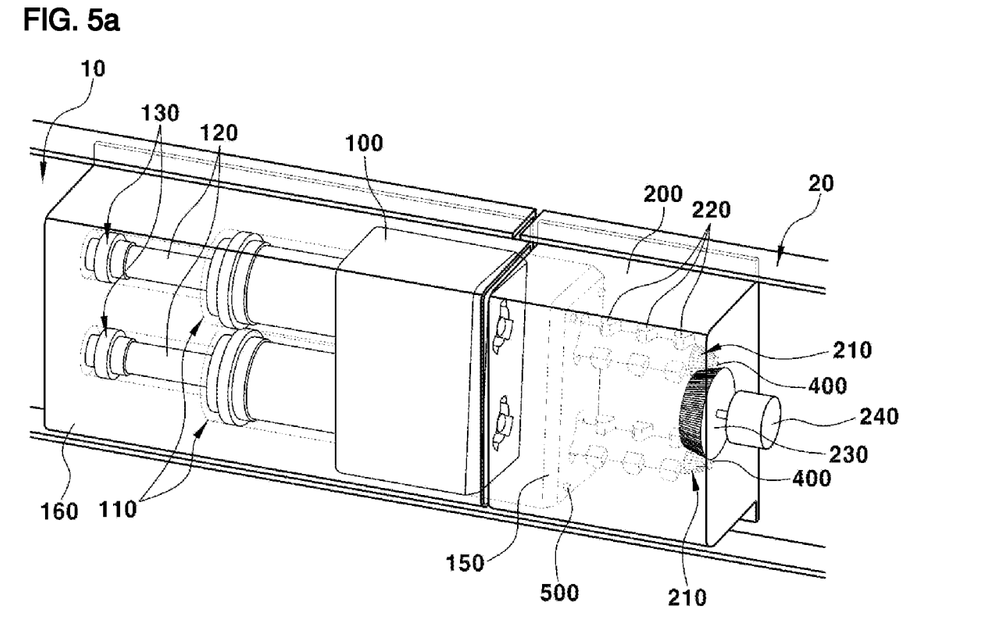
FIG. 5a illustrates an initial fastened state of the locking unit and the receiving unit as the exemplary embodiment of the present disclosure.
Figure 5B:
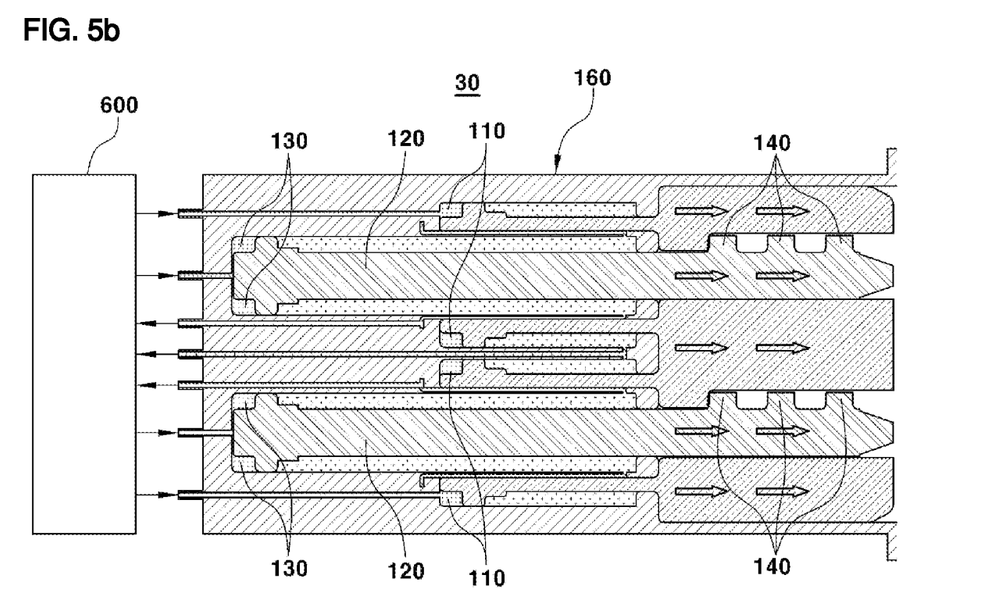
FIG. 5b illustrates a fluid pressure distribution in the initial fastened state of the locking unit and the receiving unit as the exemplary embodiment of the present disclosure.

FIGS. 5a and 5b illustrate a structure in which the locking assembly 30 and the receiving unit 200 come into contact with each other, and fluid control of the fluid pressure unit 600 as the exemplary embodiment of the present disclosure.

When the end of the first chassis frame 10 at which the locking assembly 30 is positioned comes into contact with the end of the second chassis frame 20 including the receiving unit 200, the first switch 300 is switched to a turned-on state. As the first switch 300 is switched to a turned-on state, the fluid pressure unit 600 introduces the fluid into the locking chamber no and the cylinder chamber 130.

As the first switch 300 is switched to a turned-on state, the fluid pressure unit 600 introduces the fluid so that the same fluid pressure is applied to the locking chamber no and the cylinder chamber 130, and the locking unit 100 and the cylinder 120 are simultaneously inserted into the receiving unit 200.

As illustrated in FIG. 5b, the fluid pressure unit 600 is configured to simultaneously apply the fluid to the locking chamber no and the cylinder chamber 130, and thus, the locking unit 100 and the cylinder 120 perform the movement of the cylinder housing 160 in the longitudinal direction through the same fluid pressure. Accordingly, at least parts of the locking unit 100 and the cylinder 120 are inserted into the receiving unit 200.

Figure 6A:
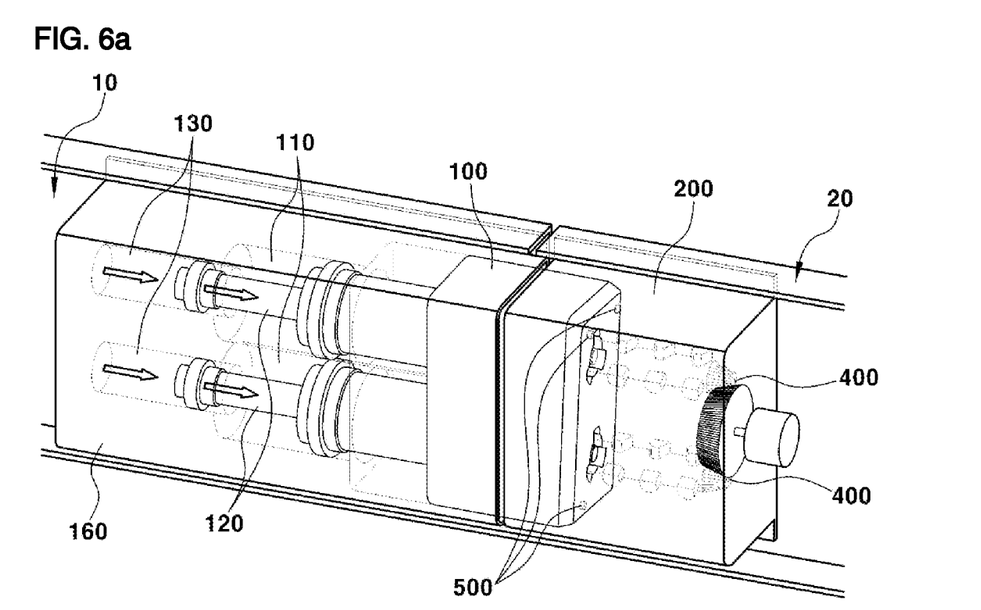
FIG. 6a illustrates a configuration in a state in which at least a part of the locking unit is inserted into the receiving unit as the exemplary embodiment of the present disclosure.
Figure 6B:
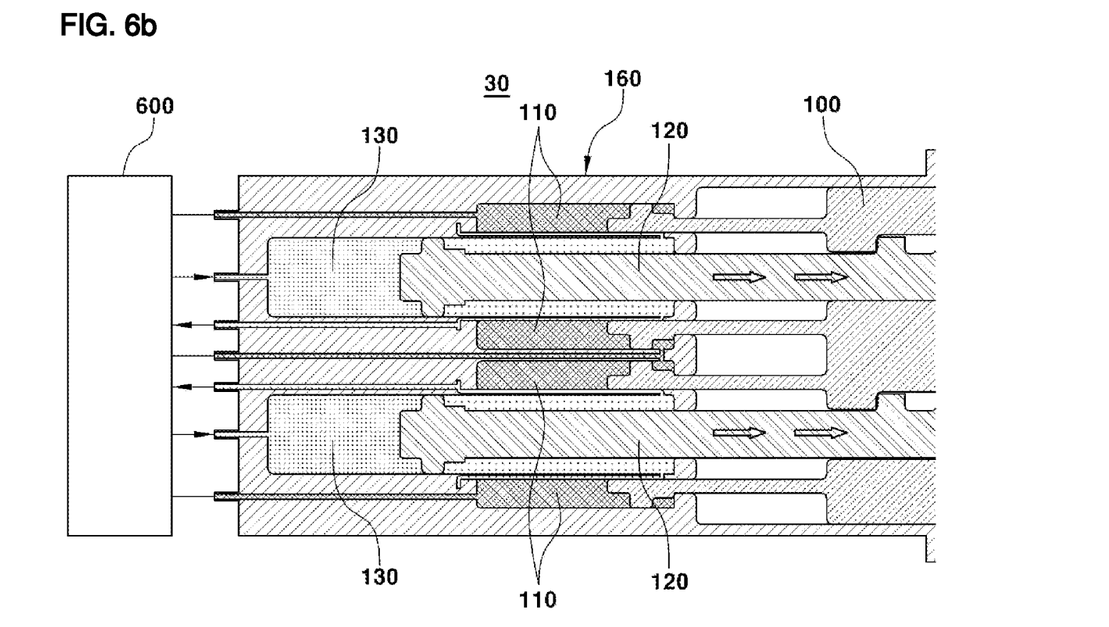
FIG. 6b illustrates a fluid pressure distribution in a fastened state in which at least a part of the locking unit is inserted into the receiving unit as the exemplary embodiment of the present disclosure.

FIGS. 6a and 6b illustrate a state in which the locking unit 100 and the cylinder 120 are inserted into the receiving unit 200.

As illustrated, as one end surface of the locking unit wo faces the inner surface of the receiving unit 200, the third switch 500 is switched to a turned-on state.

When the third switch 500 is switched to a turned-on state, it is determined that the locking unit wo and the inner surface of the receiving unit 200 are fastened, and then, the fluid is additionally introduced into the cylinder chamber 130 through the fluid pressure unit 600. The outermost surface of the end of the locking unit 100 which faces the inner surface of the receiving unit 200 in which the third switch 500 is positioned may be configured as a chamfered region 150 to absorb the positional tolerance between the receiving unit 200 and the locking unit 100.

As at least a part of the locking unit wo is inserted into the receiving unit 200, rigidity between the first chassis frame 10 and the second chassis frame 20 in the vertical direction may be secured.

Figure 7A:
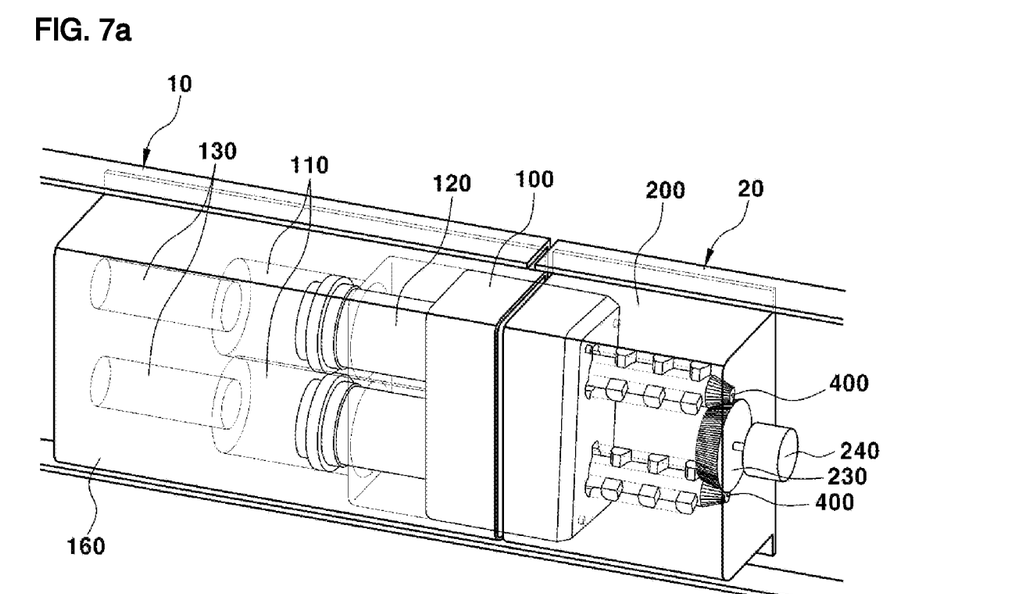
FIG. 7a illustrates a configuration in a state in which cylinders are inserted into the receiving unit as the exemplary embodiment of the present disclosure.
Figure 7B:
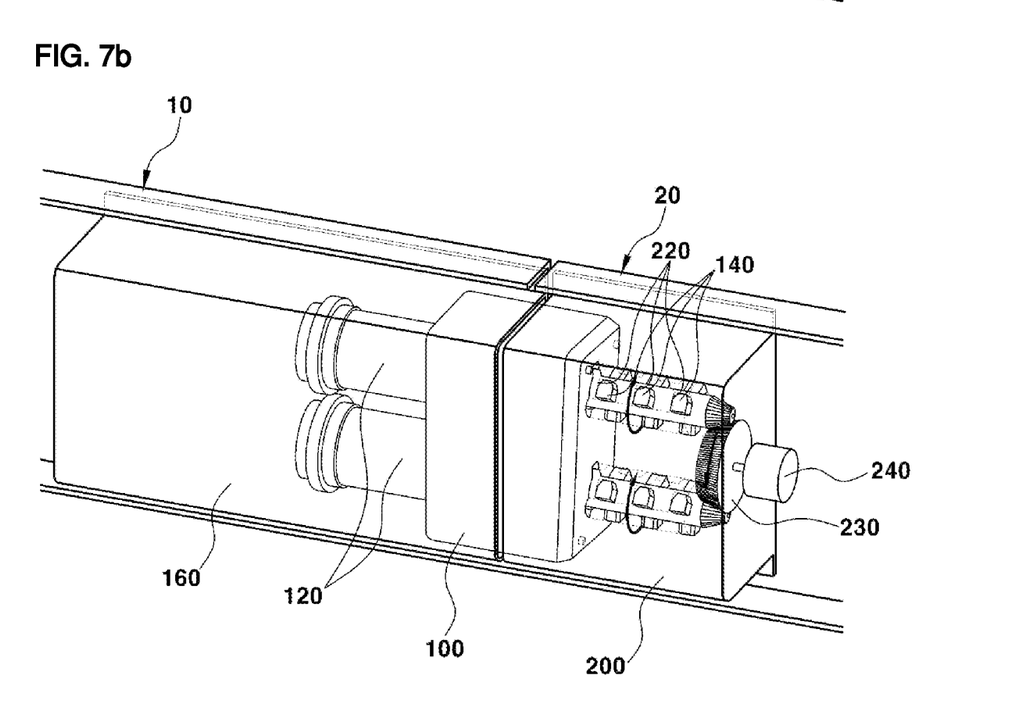
FIG. 7b illustrates a configuration diagram in a fastened state in which the cylinders are inserted into the receiving unit as the exemplary embodiment of the present disclosure.

FIGS. 7a and 7b illustrate a coupling relationship in which the cylinder 120 is inserted along the guide part 210 in the receiving unit 200 after the locking unit 100 and the receiving unit 200 are fastened.

By the fluid additionally introduced into the cylinder chamber 130 from the fluid pressure unit 600, the cylinder 120 is moved to a position to be in contact with the inner end of the guide part 210 of the receiving unit 200. As the second switch 400 positioned at the end of the guide part 210 comes into contact with the end of the cylinder 120, the second switch 400 is switched to a turned-on state to perform driving of the motor 240 which is fastened to the gear part 230.

When the second switch 400 is switched to a turned-on state, electric power is applied to the motor 240, and by the applied electric power, the gear part 230 is rotated integrally with the motor 240 in one direction. The rotational force of the gear part 230 is transferred to the cylinder 120, and the cylinder 120 is rotated, and the protrusion 140 is inserted into the engagement part 220.

The engagement part 220 is configured to have a shape substantially corresponding to that of the protrusion 140. When the protrusion 140 inserted into the engagement part 220 in the longitudinal direction is rotated, the protrusion 140 may be further inserted into the engagement part 220. In the exemplary embodiment of the present disclosure in which the two cylinders 120 are positioned, the protrusion 140 positioned on each cylinder 120 is inserted into the engagement part 220 formed in the corresponding guide part 210, and thereby, is limited in movement in the longitudinal direction.

As described above, as a part of the locking unit 100 is inserted into the receiving unit 200, rigidity in the vertical direction is reinforced at the fastening ends of the first chassis frame 10 and the second chassis frame 20. Also, as the protrusion 140 of the cylinder 120 is fastened in the engagement part 220, rigidity between the first chassis frame 10 and the second chassis frame 20 in the longitudinal direction may be provided.

In addition, in the exemplary embodiment of the present disclosure, a fastening structure between the first chassis frame 10 and the second chassis frame 20 may be further included, and a fixing structure for reinforcing strength along the exposed outer surfaces of the first chassis frame 10 and the second chassis frame 20 may be further included.

Figure 8:
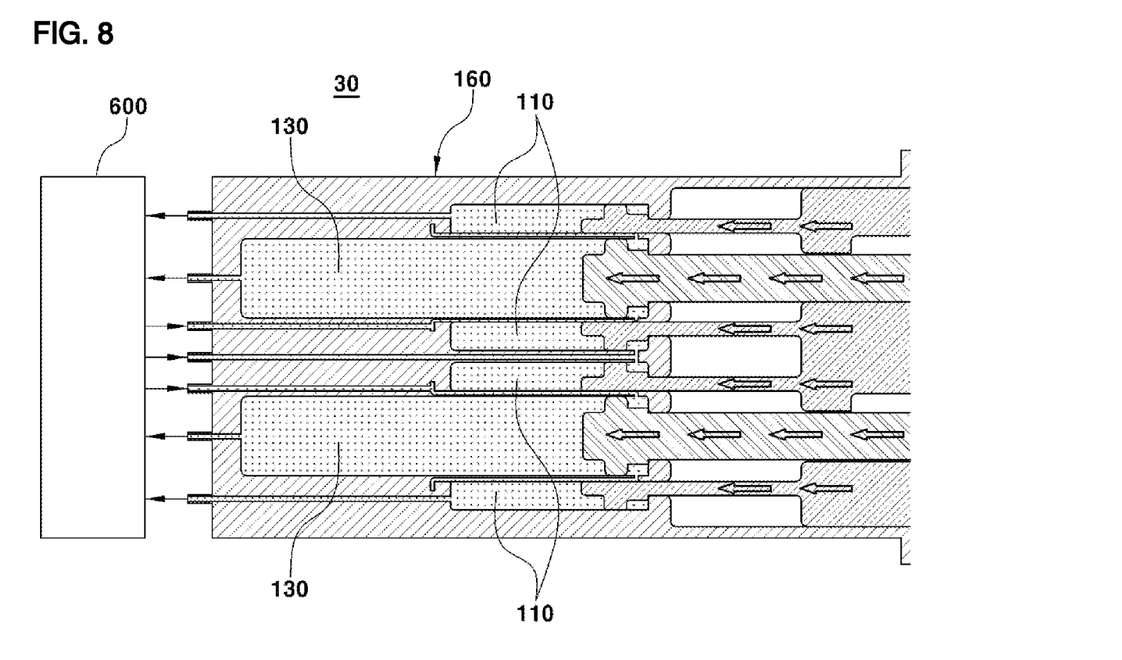
FIG. 8 illustrates a fluid pressure distribution in a state in which the locking unit is released from the receiving unit as the exemplary embodiment of the present disclosure.

FIG. 8 illustrates a configuration for performing fluid control of the fluid pressure unit 600 for converting the fastened state of the first chassis frame 10 and the second chassis frame 20 into a released state.

When the first chassis frame 10 and the second chassis frame 20 are converted into the released state, rotation of the gear part 230 is performed using the rotational force of the motor 240 and the protrusion 140 of the cylinder is returned to a position corresponding to the guide part 210.

When the protrusion 140 is returned to the position corresponding to the guide part 210, the fluid introduced into the locking chamber no and the cylinder chamber 130 is discharged by the fluid pressure unit 600. Furthermore, the fluid is applied from the fluid pressure unit 600 to a locking release chamber positioned remote from the fluid pressure unit 600 in the longitudinal direction as a counter part of the locking chamber no. Further, the fluid is applied from the fluid pressure unit 600 into a cylinder release chamber positioned remote from the fluid pressure unit 600 as a counter part of the cylinder chamber 130.

Accordingly, the cylinder 120 and the locking unit 100 are moved into the first chassis frame 10 in the longitudinal direction, and the second switch 400 and the third switch 500 are switched to turned-off states.

That is, in an order reverse to an order in which the first chassis frame 10 and the second chassis frame 20 are fastened, the protrusion 140 of the cylinder 120 is rotated and moved to a position corresponding to the guide part 210, and the cylinder 120 and the locking unit 100 are moved in the longitudinal direction of the cylinder housing 160 to be spaced apart from the second chassis frame 20, so that the fastening between the first chassis frame 10 and the second chassis frame 20 is configured is released.

The aforementioned detailed description is illustrative of the present disclosure. Further, the aforementioned contents show and describes preferred exemplary embodiments of the present disclosure, and the present disclosure may be used in various other combinations, modifications, and environments. That is, changes or modifications are possible within the scope of the concept of the disclosure disclosed in the present specification, the scope equivalent to the disclosed contents, and/or within the scope of technology or knowledge in the art. The described exemplary embodiment describes the best mode for implementing the technical spirit of the present disclosure, and various changes required in specific application fields and uses of the present disclosure are possible. Therefore, the detailed description of the present disclosure is not intended to limit the present disclosure to the disclosed exemplary embodiments. Further, the appended claims should be construed as including other exemplary embodiments as well.

What is claimed is:

1. An apparatus for locking chassis frames, comprising:
a locking assembly positioned at one end of a first chassis frame;
a second chassis frame corresponding to the first chassis frame in a longitudinal direction; and
a receiving unit positioned in the second chassis frame, and configured such that at least a part of the locking assembly is configured to be inserted into the receiving unit, wherein the locking assembly comprises:
a cylinder housing positioned in the first chassis frame,
a locking unit moved in the cylinder housing, and
a first switch part positioned at one end of the cylinder housing, and configured to drive a fluid pressure unit when the second chassis frame comes into contact with the first chassis frame.

2. The apparatus of claim 1, wherein the locking assembly further comprises:
a cylinder positioned in the locking unit and extending out of the locking unit; and
the fluid pressure unit configured to apply a fluid pressure to a chamber positioned on a rear surface of the locking unit so as to control movement of the locking unit and the cylinder.

3. The apparatus of claim 2, further comprising:
at least one protrusion positioned on an outer circumference of the cylinder; and
a guide part positioned in the receiving unit at a position corresponding to the at least one protrusion.

4. The apparatus of claim 3, further comprising:
a motor positioned in the receiving unit; and
a gear part, protruding inside the receiving unit, to which a rotating force of the motor is applied, and configured to rotate the cylinder when the cylinder extends out of the locking unit.

5. The apparatus of claim 4, wherein the at least one protrusion is configured to be rotated by the gear part and be engaged with an engagement part which is positioned in the guide part.

6. The apparatus of claim 4, further comprising a second switch positioned on an inner surface of the receiving unit, and configured to drive the motor when the cylinder comes into contact with the inner surface of the receiving unit.

7. The apparatus of claim 2, wherein when the first switch part is switched to a turned-on state, a fluid is introduced so that a pressure is applied from the fluid pressure unit into the chamber, and the locking unit and the cylinder are integrally introduced into an inner side of the receiving unit.

8. The apparatus of claim 7, wherein in a state in which the locking unit comes into contact with an inner surface of the receiving unit by the fluid pressure unit, the fluid is introduced so that the cylinder additionally protrudes out of the locking unit.

9. The apparatus of claim 2, wherein the fluid pressure unit is configured to discharge the fluid applied into the chamber so that fastening of the first chassis frame and the second chassis frame is released.

10. The apparatus of claim 2, wherein the chamber comprises:
a locking chamber positioned on the rear surface of the locking unit; and
a cylinder chamber positioned on a rear surface of the cylinder.

11. The apparatus of claim 1, further comprising a third switch positioned on an inner surface of the receiving unit, and configured to determine whether the locking unit comes into contact with the inner surface of the receiving unit or not.

12. The apparatus of claim 1, wherein an edge of the locking unit is configured as a chamfered region.

13. An apparatus for locking chassis frames, comprising:
a locking assembly configured to be positioned at one end of a first chassis frame, wherein at least a part of the locking assembly is configured to be inserted into a receiving unit disposed on a second chassis frame corresponding to the first chassis frame in a longitudinal direction, wherein the locking assembly comprises:
a cylinder housing configured to be positioned in the first chassis frame,
a locking unit moved in the cylinder housing, and
a first switch part positioned at one end of the cylinder housing, and configured to drive a fluid pressure unit when the second chassis frame comes into contact with the first chassis frame.

14. The apparatus of claim 13, wherein:
the locking assembly further comprises:
- a cylinder positioned in the locking unit and extending out of the locking unit;
- at least one protrusion positioned on an outer circumference of the cylinder, the at least one protrusion corresponding to a guide part positioned in the receiving unit; and
- the fluid pressure unit configured to apply a fluid pressure to a chamber positioned on a rear surface of the locking unit so as to control movement of the locking unit and the cylinder.

15. The apparatus of claim 14, further comprising the receiving unit comprising:
the guide part;
a motor positioned in the receiving unit; and
a gear part, protruding inside the receiving unit, to which a rotating force of the motor is applied, and configured to rotate the cylinder when the cylinder extends out of the locking unit.

16. An apparatus for locking chassis frames, comprising:
a locking assembly configured to be positioned at one end of a first chassis frame; and
a receiving unit configured to be positioned in a second chassis frame corresponding to the first chassis frame in a longitudinal direction, and configured such that at least a part of the locking assembly is configured to be inserted into the receiving unit, wherein the locking assembly comprises:
- a cylinder housing configured to be positioned in the first chassis frame,
- a locking unit moved in the cylinder housing, and
- a first switch part positioned at one end of the cylinder housing, and configured to drive a fluid pressure unit when the second chassis frame comes into contact with the first chassis frame.

17. The apparatus of claim 16, further comprising the first chassis frame and the second chassis frame.

* * * * *

UNITED STATES PATENT AND TRADEMARK OFFICE
CERTIFICATE OF CORRECTION

| | | |
|---|---|---|
| PATENT NO. | : 12,491,948 B2 | Page 1 of 1 |
| APPLICATION NO. | : 17/822365 | |
| DATED | : December 9, 2025 | |
| INVENTOR(S) | : Lee et al. | |

It is certified that error appears in the above-identified patent and that said Letters Patent is hereby corrected as shown below:

In the Claims

In Column 10, in Claim 9, Line 39, after "discharge" delete "the" and insert -- a --.

Signed and Sealed this
Thirteenth Day of January, 2026

John A. Squires
*Director of the United States Patent and Trademark Office*